US012413432B2

(12) United States Patent
Khan et al.

(10) Patent No.: US 12,413,432 B2
(45) Date of Patent: Sep. 9, 2025

(54) SYSTEMS AND METHODS FOR LOAD-BALANCED CHAINCODE EXECUTION AND VERIFICATION IN A BLOCKCHAIN NETWORK

(71) Applicant: Verizon Patent and Licensing Inc., Basking Ridge, NJ (US)

(72) Inventors: Ahmed A. Khan, Plano, TX (US); Nityanand Sharma, Tampa, FL (US); Mohammed Alsadi, Redmond, WA (US); Salman Ali Danish Mohammed, Wylie, TX (US); Rangesh Sripathi, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 140 days.

(21) Appl. No.: 18/508,315

(22) Filed: Nov. 14, 2023

(65) Prior Publication Data
US 2025/0158838 A1 May 15, 2025

(51) Int. Cl.
*H04L 29/06* (2006.01)
*H04L 9/00* (2022.01)

(52) U.S. Cl.
CPC ..................................... *H04L 9/50* (2022.05)

(58) Field of Classification Search
CPC .................. H04L 9/50; G06F 9/5083
See application file for complete search history.

(56) References Cited

U.S. PATENT DOCUMENTS

| 11,010,369 | B2* | 5/2021 | Zhuang | G06F 21/602 |
| 2019/0377617 | A1* | 12/2019 | Jacobs | H04L 9/0637 |
| 2020/0117493 | A1* | 4/2020 | Wang | H04L 9/0844 |
| 2021/0167942 | A1* | 6/2021 | Zhang | H04L 9/0618 |

OTHER PUBLICATIONS

S. Hu, Y.-C. Liang, Z. Xiong and D. Niyato, "Blockchain and Artificial Intelligence for Dynamic Resource Sharing in 6G and Beyond," in IEEE Wireless Communications, vol. 28, No. 4, pp. 145-151, Aug. 2021, doi: 10.1109/MWC.001.2000409. (Year: 2021).*

* cited by examiner

Primary Examiner — Ka Shan Choy

(57) ABSTRACT

A system described herein may receive a request for a blockchain network to perform a particular set of operations, such as executing chaincode recorded to a blockchain associated with the blockchain network. The system may receive Key Performance Indicators ("KPIs") of nodes of the blockchain network, and may receive a consensus policy associated with the blockchain network. The consensus policy may indicate a particular quantity of result sets used to verify execution of a given operation by the blockchain network. The system may assign different nodes of the blockchain network to perform different portions of the requested set of operations. The assignments may be determined based on the consensus policy and the KPIs of the nodes. The system may aggregate result sets from different nodes in order to generate aggregated result sets, where the quantity of aggregated result sets satisfies the consensus policy.

20 Claims, 14 Drawing Sheets

SYSTEMS AND METHODS FOR LOAD-BALANCED CHAINCODE EXECUTION AND VERIFICATION IN A BLOCKCHAIN NETWORK

BACKGROUND

Blockchains may provide for the decentralized and secure storage of data, decentralized computing, or other technical operations. Blockchains may further provide for the immutability of recorded data, as data may not be altered once recorded to a blockchain. Blockchains may be maintained by multiple nodes, such as geographically distributed or otherwise distinct servers, workstations, etc., that each maintain local copies of respective blockchains, perform computing operations based on information (e.g., executable code, instructions, variables, etc.) recorded to respective blockchains, and/or perform other operations.

DETAILED DESCRIPTION OF EXAMPLE EMBODIMENTS

The following detailed description refers to the accompanying drawings. The same reference numbers in different drawings may identify the same or similar elements.

Blockchains may be maintained by multiple nodes, such as geographically distributed or otherwise distinct servers, workstations, etc., that each maintain local copies of respective blockchains. A blockchain network may refer to a particular group of nodes that communicate with each other to maintain a particular blockchain, which may include participating in consensus mechanisms to validate records added to the blockchain, prior to the confirmation or addition of such records to the blockchain. This consensus mechanism may facilitate the decentralized nature of the blockchain, inasmuch as records are not able to be added to the blockchain without validation, verification, approval, etc. from at least a threshold quantity of the nodes (e.g., a "quorum").

The consensus mechanism may include performing computations, such as executing chaincode (e.g., instructions, code, etc. maintained on the blockchain) or other suitable computations or operations, by at least the threshold quantity of nodes. Such computations may be based on input data provided by a client device or other entity seeking to add a record to the blockchain, and may yield one or more outputs, results, etc. as a result of performing the requested computations on the provided set of input. As discussed below with respect to FIG. 2, since only a threshold quantity of nodes are required to perform the computations in accordance with a given consensus mechanism, situations may arise in which some nodes perform relatively complex computations, while other nodes are idle. Embodiments described herein provide for a load-balancing mechanism to more efficiently utilize the resources of nodes of a node group, while maintaining the decentralization and security provided by consensus mechanisms for a blockchain network.

Figure 1:
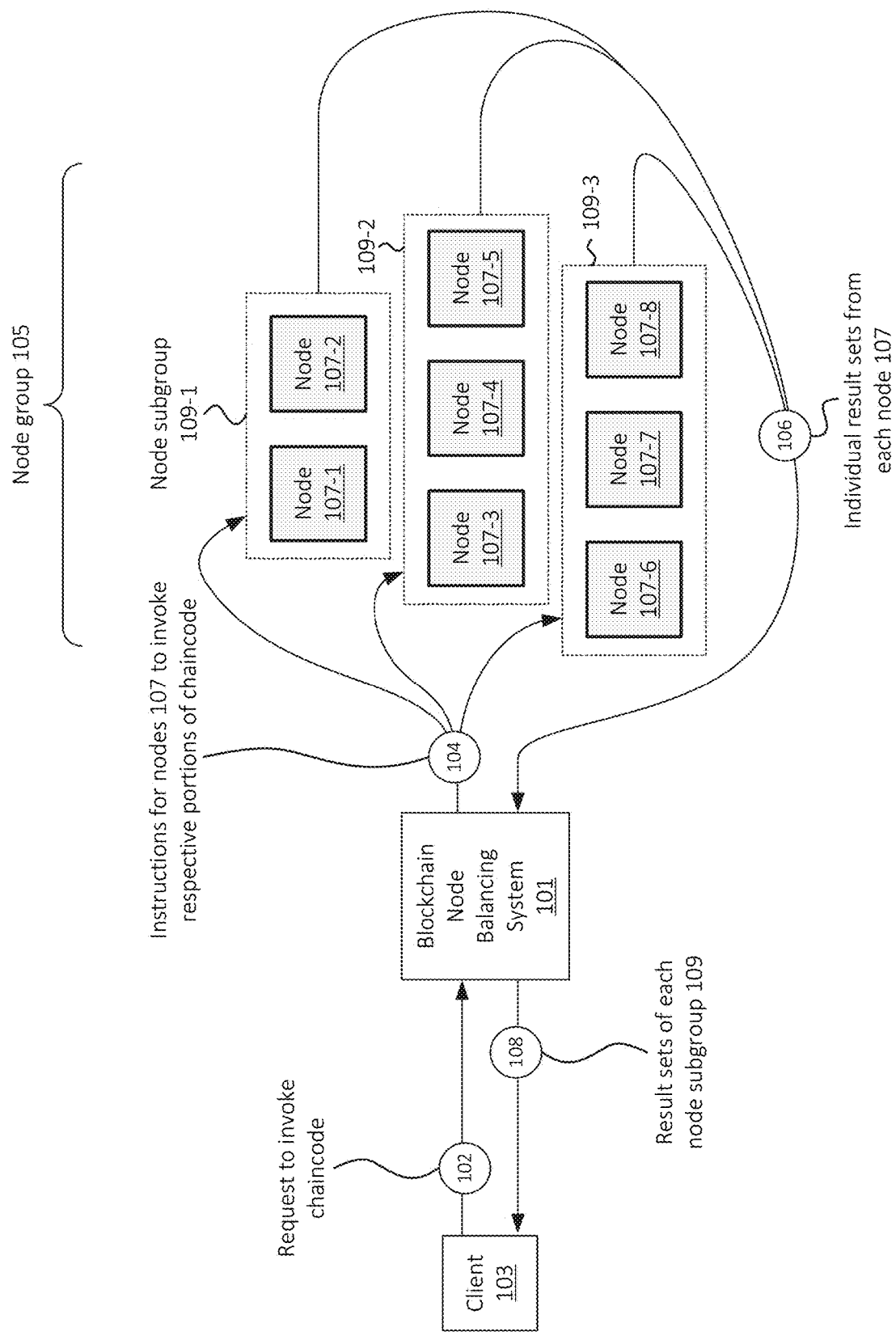
FIG. 1 illustrates an example overview of one or more embodiments described herein.

As shown in FIG. 1, for example, Blockchain Node Balancing System ("BNBS") 101 may receive (at 102) a request to invoke a particular set of operations, such as chaincode associated with (e.g., recorded to) a particular blockchain. BNBS 101 may, for example, receive the request from a particular client device 103, which may include or may be communicatively coupled to a workstation, a smartphone, a tablet, or some other suitable type of device. The request may indicate a particular blockchain and/or a particular node group (e.g., node group 105) that maintains a particular blockchain. In some embodiments, the request may indicate a particular channel associated with a blockchain framework that provides for different channels or blockchains to be maintained by different node groups. Such framework may include a Hyperledger® Fabric framework or other suitable framework or application programming interface ("API").

As shown, node group 105 may include a set of nodes 107, which may be implemented in a containerized environment, in which various containers, cloud systems, and/or other virtualized environments implement one or more nodes 107. Additionally, or alternatively, one or more nodes 107 may be implemented by a discrete device or set of hardware resources. In the examples provided herein, node group 105 includes nodes 107-1 through 107-8. In practice, node groups, channels, blockchains networks, etc. may include additional or fewer nodes.

Assume, in this example, that the consensus mechanism associated with node group 105 indicates that three result sets should be generated by node group 105 and used for verification in accordance with the consensus mechanism. In accordance with some embodiments, and as described in more detail below, BNBS 101 may split, divide, etc. the requested operation from client device 103 into several different portions. The portions may be split up according to different portions of the chaincode, may be split according to different subsets of the input parameters, and/or may be split in some other suitable manner.

In this example, BNBS 101 may split the requested operation into three different portions, as three result sets are required in accordance with the consensus mechanism. The three different portions may be provided for execution by different subgroups 109 of node group 105. For example, a first portion may be provided for execution by a first node subgroup 109-1, a second portion may be provided for execution by a second node subgroup 109-2, and a third portion may be provided for execution by a third node subgroup 109-3.

In accordance with some embodiments, the splitting of the requested operations and/or the selection of nodes 107 for each node subgroup 109 may be performed based on Key Performance Indicators ("KPIs") associated with nodes 107, where such KPIs indicate measures of load, availability, capacity, utilization, capability, etc. of respective nodes 107. The KPIs may include, for example, processor utilization metrics, processor attributes (e.g., clock speed, quantity of cores, etc.), memory utilization metrics, memory attributes (e.g., memory speed, memory size, etc.), and/or other suitable metrics. Generally, the KPIs for a given node 107 may be used to identify the ability of such node 107 to execute operations, or portions of operations, requested by one or more client devices 103. For example, BNBS 101 may select relatively less processor-intensive operations (or fewer operations) to be performed by nodes 107 that have relatively high processor load metrics (e.g., loaded or overloaded processors), and may select relatively more processor-intensive operations (or more operations) to be performed by nodes 107 that have relatively low processor load metrics (e.g., unutilized or underutilized processors).

BNBS 101 may make such selections on a dynamic basis, such that different nodes 107 and/or node subgroups 109 are selected to perform different operations or portions of operations requested by one or more client devices 103. For example, node subgroups 109-1, 109-2, and 109-3 may be selected to perform the particular operation requested (at 102) by client device 103, while different node subgroups may be selected to perform another operation by client device 103 or some other device or system. The different node subgroups may be selected, for different operations, based on factors such as KPIs of respective nodes 107, complexity of the requested operations, and/or other suitable factors.

Each node 107 may perform the respective portion of the operation requested by client device 103 (e.g., a particular portion of the requested chaincode, as indicated by BNBS 101). For example, node 107-1 may perform a first portion of the requested chaincode, node 107-2 may perform a second portion of the requested chaincode, etc. Each node 107 may provide (at 106) results of the portion of the chaincode indicated for such node 107. BNBS 101 may generate result sets on a per-subgroup basis based on the received results from each node 107. For example, a first result set may be generated based on the results provided by node subgroup 109-1 (e.g., by nodes 107-1 and 107-2), a second result set may be generated based on the results provided by node subgroup 109-2 (e.g., by nodes 107-3, 107-4, and 107-5), and a third result set may be generated based on the results provided by node subgroup 109-3 (e.g., by nodes 107-6, 107-7, and 107-8). Each per-subgroup result set may include cryptographic signatures or other suitable mechanisms whereby the individual results from each node 107 may be verified. BNBS 101 may further provide (at 108) the per-subgroup result sets to client device 103, which may perform further operations based on receiving the result sets. For example, client device 103 may compare the result sets to verify that the result sets include the same values, may initiate a commit or recording operation to record the results to the blockchain maintained by node group 105, and/or other suitable operations discussed below.

Figure 2:
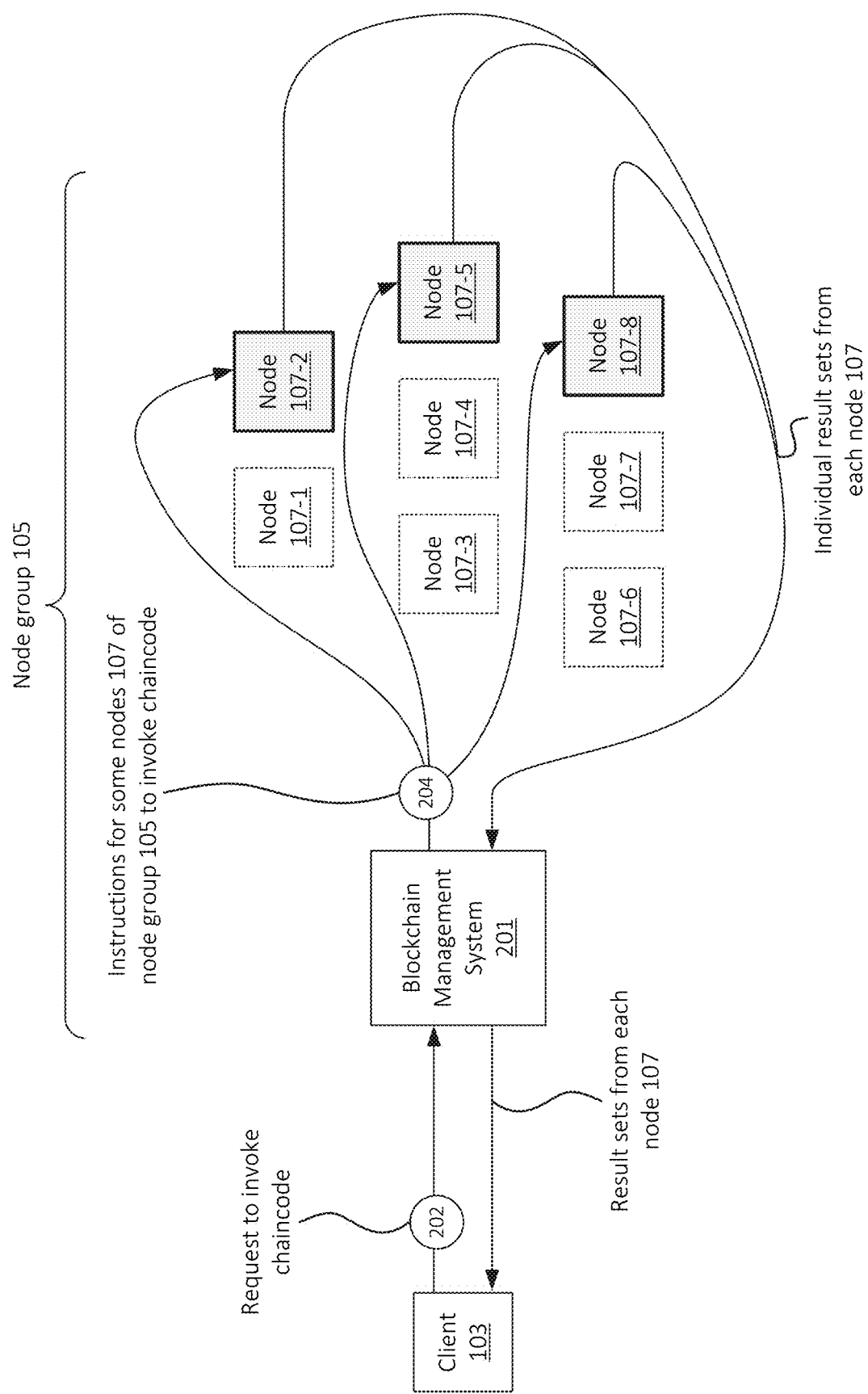
FIG. 2 illustrates an example of obtaining result sets computed by individual nodes of a blockchain network.

FIG. 2 illustrates an example in which the load-balancing techniques described herein are not performed. In this example, client device 103 may request (at 202) that node group 105 execute particular chaincode or other suitable operations. Client device 103 may output (at 202) the request to Blockchain Management System ("BMS") 201, which may provide an interface between node group 105 and client device 103, may instruct particular nodes 107 to perform particular operations, and/or may perform other functions. Again assuming that a consensus mechanism used by node group 105 requires results from three nodes, BMS 201 may accordingly select (at 204) three particular nodes 107 (i.e., nodes 107-2, 107-5, and 107-8, in this example) to execute the requested operations. As shown, the other nodes 107 (i.e., nodes 107-1, 107-3, 107-4, 107-6, and 107-7, in this example) may not be selected to perform any of the operations. As noted above, situations may arise in which the selected nodes are performing relatively complex or processor-intensive operations, while the non-selected nodes may be idle or underutilized.

Accordingly, the node load-balancing mechanism of some embodiments, as illustrated in FIG. 1, may provide for a more efficient use of resources than the example shown in FIG. 2. Further, the node load-balancing mechanism of some embodiments may ultimately generate results faster than implementations that do not perform such load-balancing.

Figure 3:
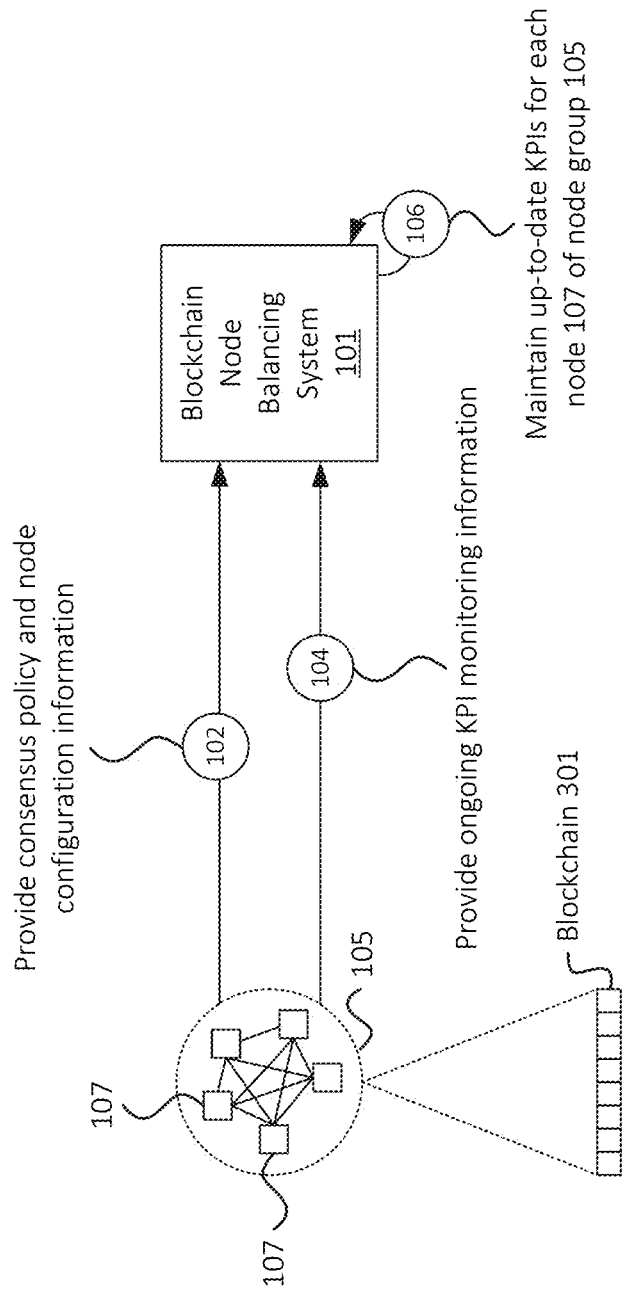
FIGS. 3-9 illustrate examples of a node load-balancing mechanism of some embodiments.

FIGS. 3-9 provide further details on the node load-balancing mechanism of some embodiments. As shown in FIG. 3, BNBS 101 may receive (at 302) a consensus policy from node group 105. For example, a particular node 107 may provide the consensus policy, BMS 201 with which node group 105 is associated may provide the consensus policy, or some other device or system may provide the consensus policy to BNBS 101. As noted above, node group 105 may maintain a particular blockchain 301 (e.g., each node 107 of node group 105 may maintain a local copy of blockchain 301). In this sense, node group 105 may be or may implement a blockchain network, a channel, etc. with respect to blockchain 301. The consensus policy may indicate, for example, a threshold quantity of nodes 107 from which results are required before respective records may be added to blockchain 301.

BNBS 101 may also receive (at 102) node configuration information, which may include attributes such as processor attributes, memory attributes, etc. as discussed above. The node configuration information may include communication information, such as Internet Protocol ("IP") addresses, Uniform Resource Identifiers ("URIs"), or other suitable information associated with each node 107.

Node group 105 (e.g., BMS 201, individual nodes 107, and/or some other device or system associated with node group 105) may also provide (at 104), on an ongoing basis, KPI monitoring information to BNBS 101. As discussed above, such information may include load metrics for each node 107 and/or other suitable information based on which BNBS 101 may be able to identify availability or capability of each node 107 to perform particular computations or other operations. BNBS 101 may accordingly maintain (at 106) up-to-date KPIs for each node 107 of node group 105.

Figure 4:
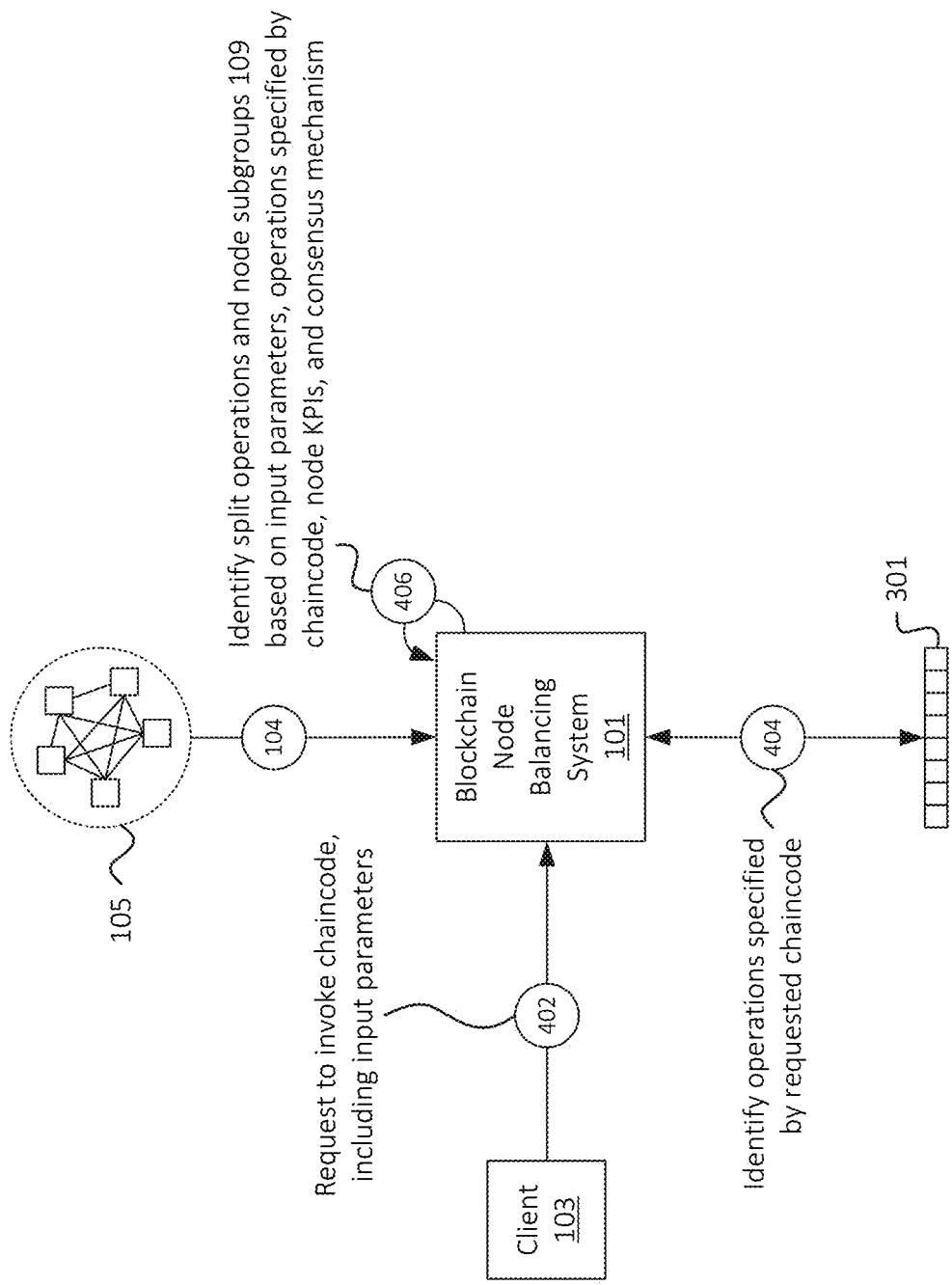

As shown in FIG. 4, BNBS 101 may receive (at 402) a request to invoke particular chaincode, such as chaincode that was previously recorded to blockchain 301. The request may include an address, a hash, or other suitable identifier of the chaincode as recorded to blockchain 301. The request may also include input parameters, which may include one or more values, variables, etc. which are to be used as input parameters for the chaincode. For example, a request to record a particular set of data to blockchain 301 may include the particular set of data as the input parameters.

BNBS 101 may also identify (at 404) operations specified by the requested chaincode. For example, BNBS 101 may identify subroutines, portions, etc. of the chaincode that BNBS 101 may potentially split up for execution by different nodes. As one example, BNBS 101 may identify operations, specified in the chaincode, that are able to be performed in parallel (e.g., independent operations or sets of operations). As noted above, BNBS 101 may also receive (at 104) and maintain up-to-date KPI information associated with respective nodes 107 of node group 105. Based on the received KPIs, input parameters, operations specified in the chaincode, and the chaincode mechanism associated with node group 105 (e.g., a threshold quantity of results of executing the chaincode before committing the results to blockchain 301), BNBS 101 may identify (at 406) split operations and node subgroups 109. That is, BNBS 101 may identify particular nodes 107 to perform particular portions of the requested chaincode.

Figure 5:
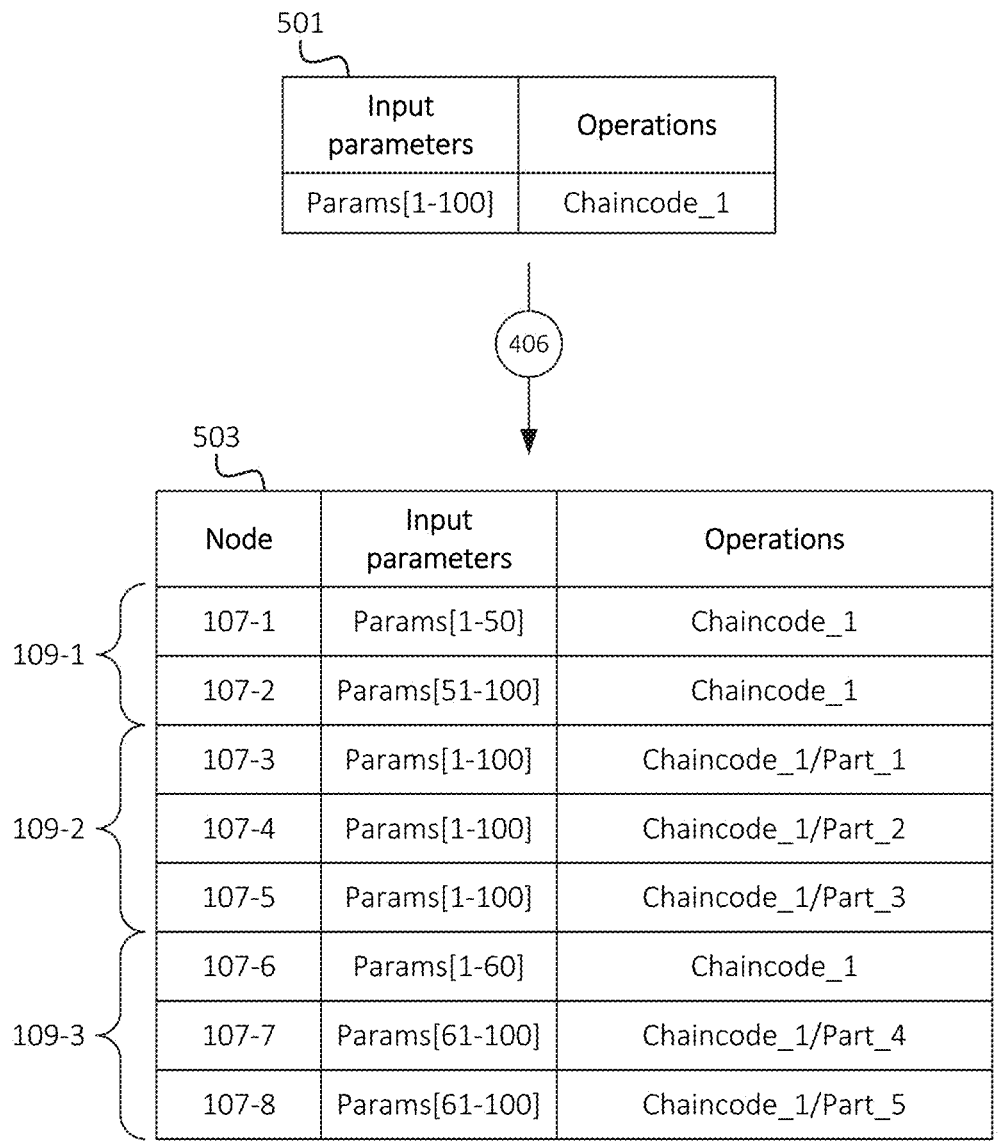

FIG. 5 illustrates an example of how the requested chaincode execution may be split (at 406) into different operations. Data structure 501 reflects the requested chaincode, as well as the input parameters (e.g., as provided (at 402) by client device 103). In this example, the input parameters include 100 values, and the requested operations include invoking particular chaincode ("Chaincode_1"), which may be included in one or more records (e.g., addresses) of blockchain 301.

Data structure 503 reflects an example of split operations determined by BNBS 101 based on node KPIs, the requested operations and input parameters, and consensus mechanism. As shown, and as similarly discussed above, BNBS 101 may have selected nodes 107-1 and 107-2 as a first node subgroup 109-1, and so on. Each node subgroup 109 may be selected, and the operations may be split, such that the ultimate results of each node 107 of each node subgroup 109 executing an assigned portion of the original operation on an assigned portion of the input parameters are identical to if a single node 107 had executed the original operation with the original full set of input parameters.

In this example, nodes 107-1 and 107-2 may be assigned to perform all of the operations of Chaincode_1 on different portions of the input parameters. For example, node 107-1 may be assigned to perform the operations on half of the input parameters ("Params[1-50]") and node 107-2 may be assigned to perform the operations on the other half of the input parameters ("Params[51-100]"). As one example, the chaincode may include operations to generate multiple records based on the input parameters, and/or to otherwise record information provided in or computed based on the input parameters to blockchain 301. In this example, execution of Chaincode_1 using Params[1-50] as input parameters for Chaincode_1 may include recording Params[1-50] (and/or values computed based on Params[1-50]) to blockchain 301, and execution of Chaincode_1 using Params[51-100] as input parameters may include recording Params[51-100] (and/or values computed based on Params[51-100]) to blockchain 301.

On the other hand, nodes 107-3 through 107-5 of node subgroup 109-2 may be assigned in a different manner. The difference in the assignments may be due to factors such as different load metrics, quantity of nodes, or other KPIs of the respective nodes 107 of node subgroups 109-1 and 109-2. In this example, nodes 107-3 through 107-5 may be assigned to perform different portions of Chaincode_1 (e.g., independent and/or parallel portions) on all of the input parameters. For example, node 107-3 may be assigned to perform a first portion of Chaincode_1 ("Chaincode_1/Part_1"), node 107-4 may be assigned to perform a second portion of Chaincode_1 ("Chaincode_1/Part_2"), and node 107-5 may be assigned to perform a third portion of Chaincode_1 ("Chaincode_1/Part_3").

Further, nodes 107-6 through 107-8 of node subgroup 109-3 may be assigned to perform different portions of Chaincode_1 on different splits of the input parameters. For example, node 107-6 may be assigned to execute all of the operations of Chaincode_1 on a portion of the input parameters (e.g., "Params[1-60]"), while nodes 107-7 and 107-8 may be assigned to process the rest of the input parameters. Specifically, for example, node 107-7 may be assigned to execute a particular portion of Chaincode_1 ("Chaincode_1/Part_4") using Params[61-100] as input, and node 107-8 may be assigned to execute the remainder of Chaincode_1 ("Chaincode_1/Part_5") using Params[61-100] as input.

While FIG. 5 provides conceptual examples of splitting up a requested set of operations, other variations or implements are possible in practice. Further, any suitable technique for splitting a requested set of operations and/or input parameters (e.g., as provided by client device 103) may be used, such that different nodes 107 are assigned to execute such split operations in accordance with their capabilities and/or measures of load.

Figure 6:
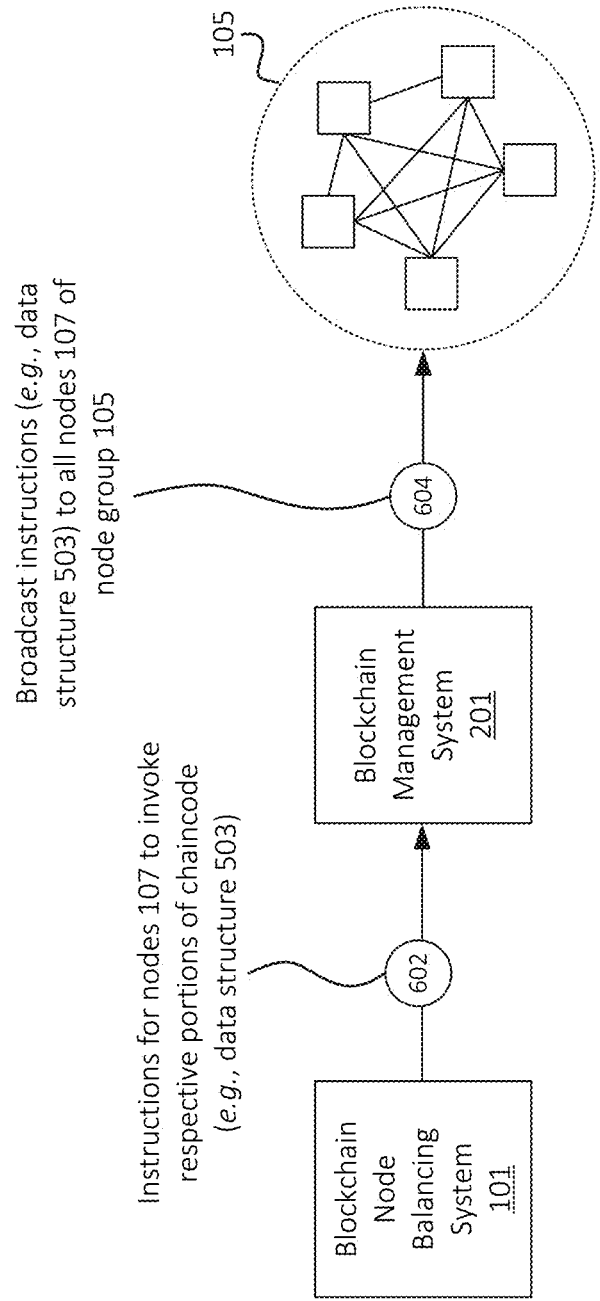

As shown in FIG. 6, BNBS 101 may output (at 602) instructions for respective nodes 107 to invoke respective portions of the requested chaincode. In some embodiments, the instructions may include, may be derived from, and/or may otherwise be reflected by data structure 503. BMS 201 may authenticate BNBS 101 and verify that BNBS 101 is authorized to provide the instructions. For example, BNBS 101 may have previously registered with BMS 201 as an authorized entity to issue such instructions, which may include generating one or more authentication tokens or establishing other suitable authentication mechanisms.

BMS 201 may accordingly broadcast (at 604) the instructions to nodes 107 of node group 105. For example, BMS 201 may provide the entirety of data structure 503, and/or instructions based on the information included therein, to all nodes 107 of node group 105. Individual nodes 107 may identify respective operations and/or input parameters assigned to them, and may execute such operations based on the particular assigned input parameters. For example, nodes 107 may execute specified portions of the chaincode, and/or may use a specified portion of the input parameters when executing such chaincode.

In some embodiments, the chaincode itself may include conditions, logic, etc. which may be evaluated by nodes 107 in order to cause nodes 107 to perform respective assigned portions of the chaincode. For example, a particular node 107 may use data structure 503, and/or the data included therein, as input when invoking the chaincode. For example, the particular node 107 may pass the information indicating the assigned portions of the chaincode and/or the assigned portions of the input parameters, for all nodes 107, as input when invoking the chaincode. The chaincode itself may include an indication that respective nodes 107 should only execute portions of the chaincode or input parameters to which such nodes 107 have been assigned.

Figure 7:
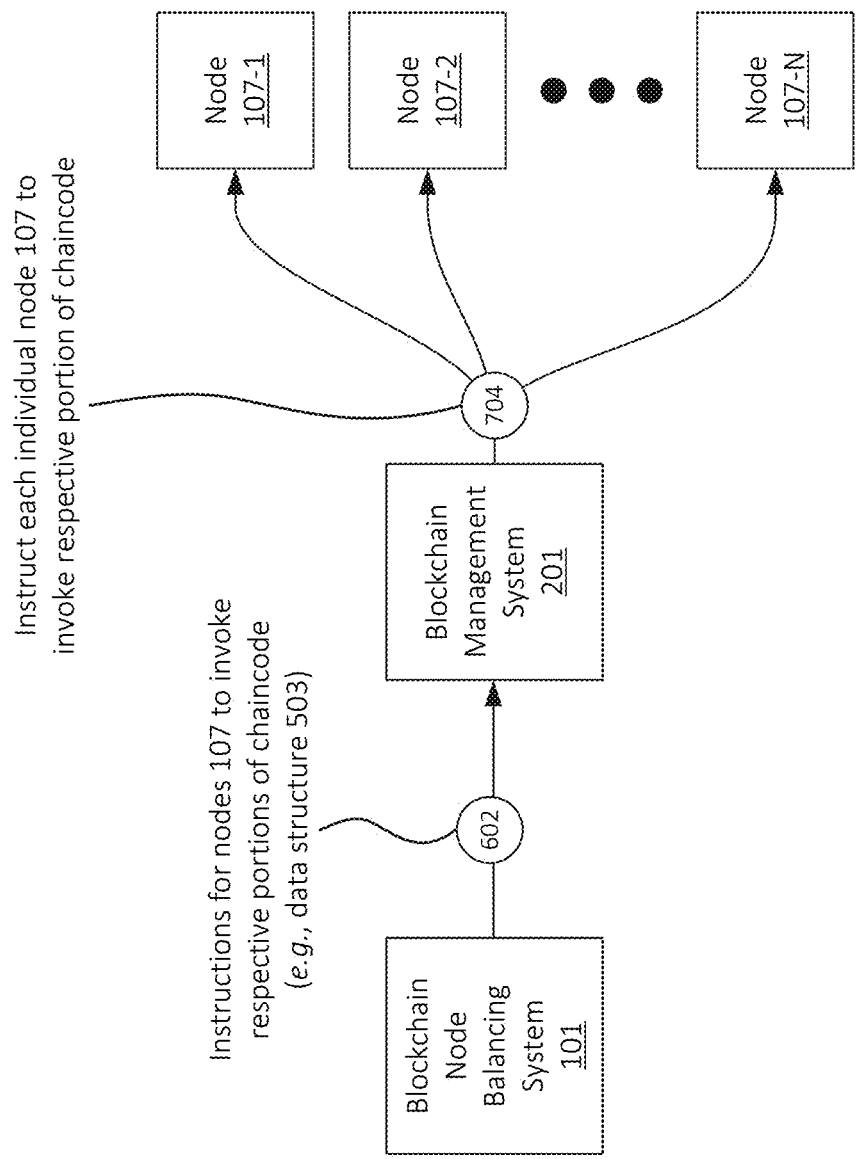

As shown in FIG. 7, BMS 201 may, instead of broadcasting the instructions for all nodes 107, instruct (at 704) each node 107 to individually execute its respective portion of the requested chaincode. For example, BMS 201 may identify that node 107-1 is assigned to execute the chaincode on a particular set of input parameters (e.g., a subset of the input parameters specified in the request (at 602) from BNBS 101), and may instruct (at 704) node 107-1 to execute the chaincode on the particular set of input parameters. Similarly, BMS 201 may provide different individual instructions to each node 107, such that each node 107 is instructed to execute its assigned respective portion of the chaincode based on its assigned respective portion of the input parameters.

Figure 8:
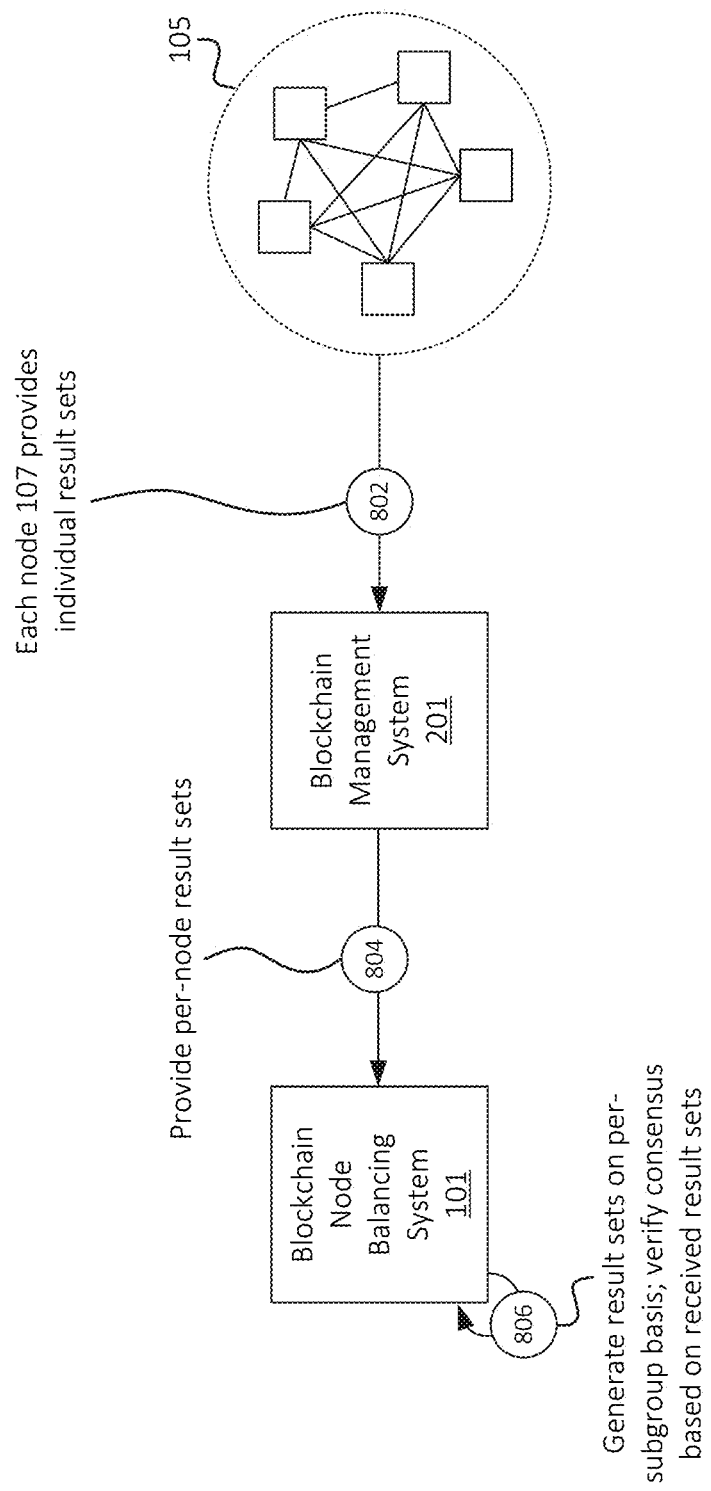

As shown in FIG. 8, each node 107 may provide (at 802) its individual result set, based on executing its own assigned portion of the chaincode based on its own assigned respective portion of the input parameters. The result sets from each node 107 may be signed with respective cryptographic signatures or may include other mechanisms by which authenticity and provenance of the result sets may be verified. BMS 201 may forward (at 804) the result sets (e.g., the result sets on a per-node basis, as generated and signed by each node 107) to BNBS 101. BNBS 101 may generate (at 806) aggregated result sets on a per-subgroup basis. For example, for each node subgroup 109, BNBS 101 may identify the respective result sets received from the nodes 107 of that subgroup, and may form an aggregate result set for each node subgroup 109 by combining the result sets from each node 107 of that node subgroup 109. In some embodiments, BNBS 101 may sign each per-subgroup result set, thus indicating that BNBS 101 has generated, verified, approved, etc. each per-subgroup result set. In the example discussed herein, BNBS 101 may generate (at 806) three per-subgroup result sets. Each per-subgroup result set may include signatures (e.g., associated with particular respective portions of the per-subgroup result set) from the nodes 107 of each given node subgroup 109, as well as a signature of BNBS 101.

As discussed above, BNBS 101 may forward the per-subgroup result sets to client device 103 or some other suitable device or system, such as an entity from which the initial request to invoke the chaincode was received. As noted above, and as discussed in more detail below, further processing may be performed based on the per-subgroup result sets, such as verifying consensus of the execution of the requested chaincode as well as committing the results to blockchain 301.

Figure 9:
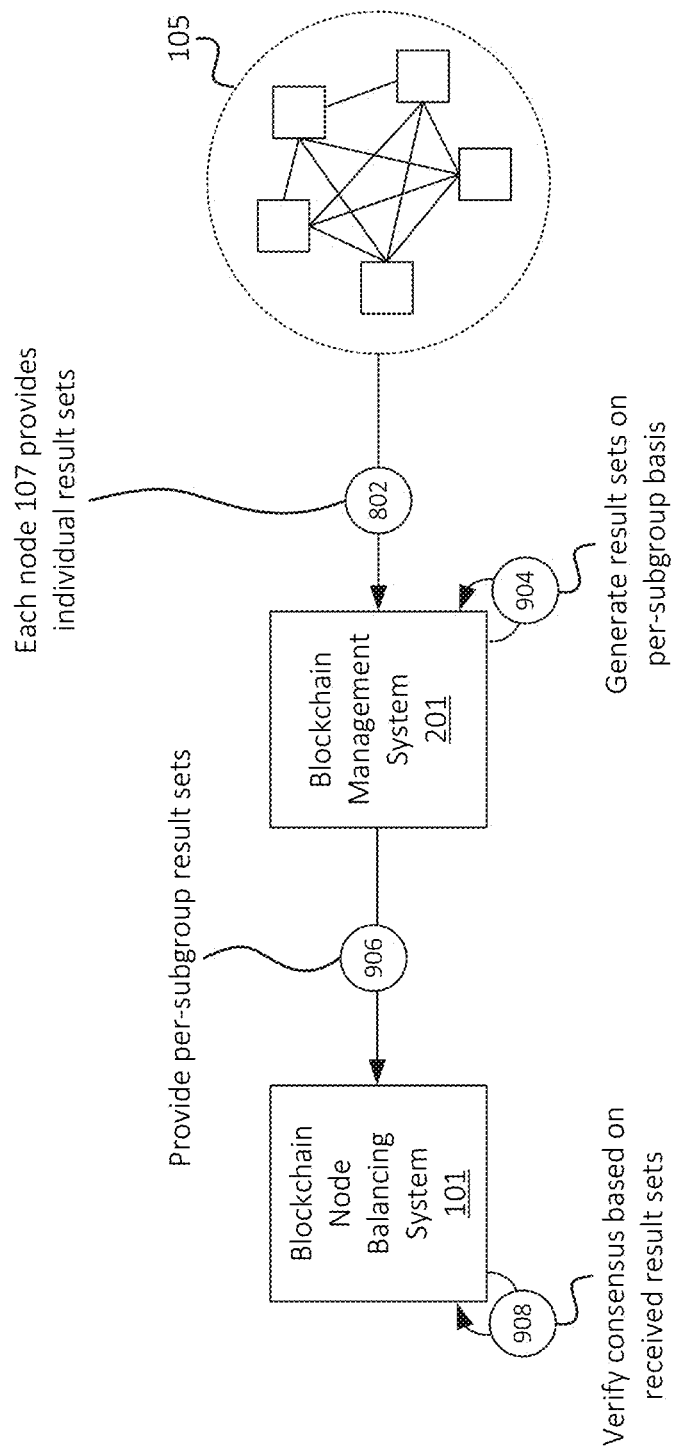

As shown in FIG. 9, BMS 201 may, in some embodiments, generate (at 904) the result sets on a per-subgroup basis, and may forward (at 906) the per-subgroup result sets to BNBS 101. That is, in some embodiments, BMS 201 may generate the per-subgroup result sets in lieu of BNBS 101 generating such result sets. As discussed above, BNBS 101 and/or some other device or system may perform further processing based on the per-subgroup result sets, such as verifying (at 908) consensus of the execution of the requested chaincode.

Figure 10A:
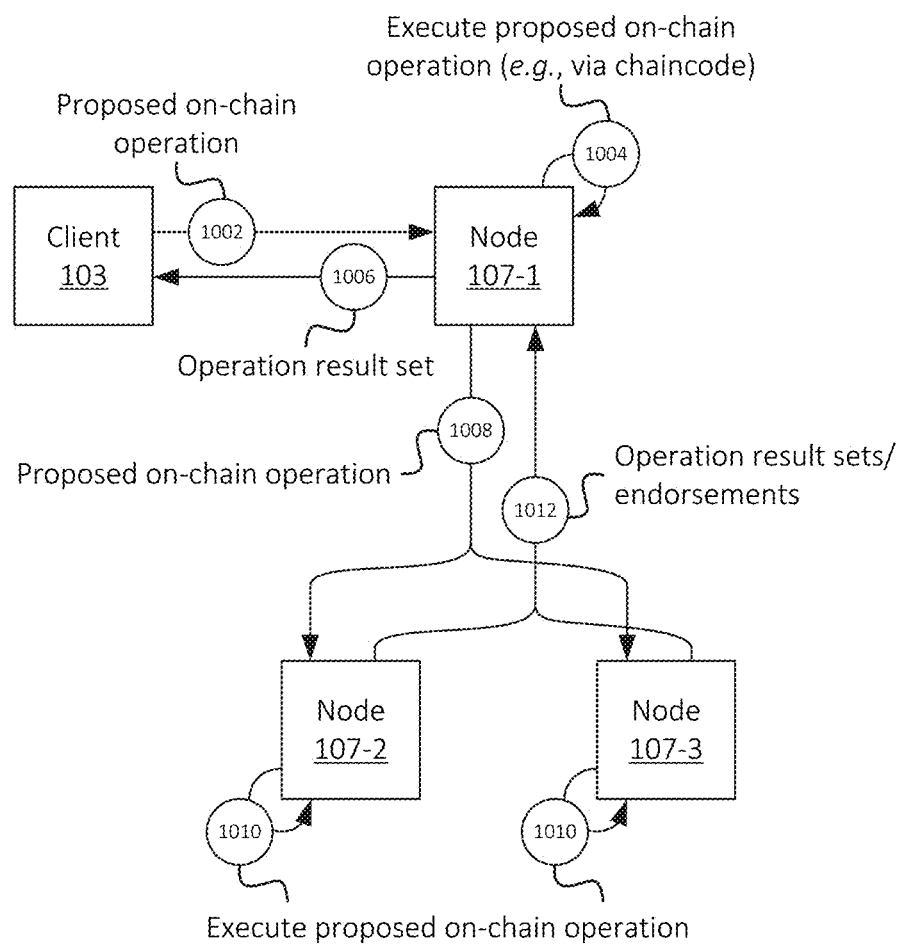
FIGS. 10A and 10B illustrate example operations associated with recording information to a blockchain, in accordance with some embodiments.
Figure 10B:
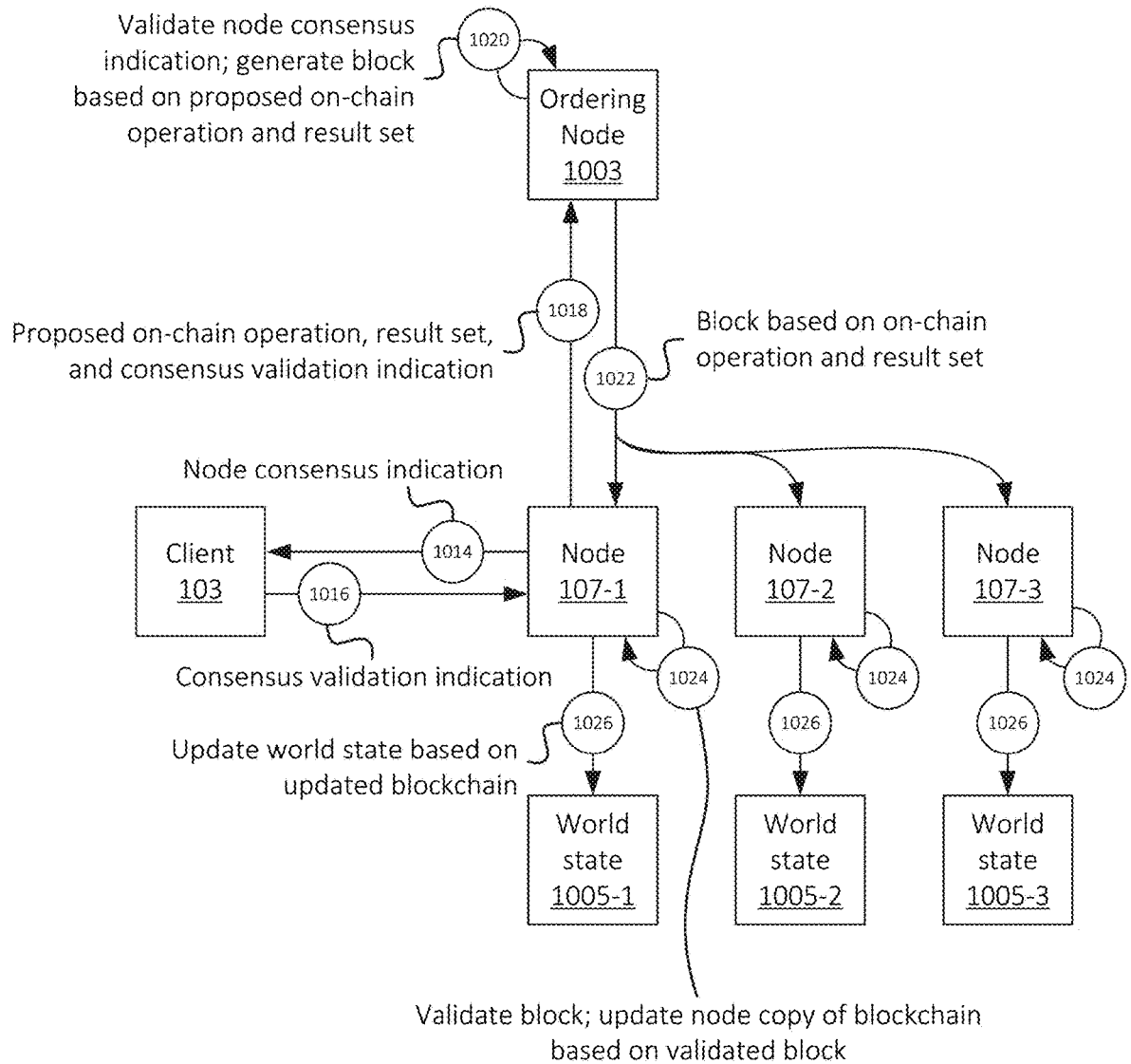

FIGS. 10A and 10B illustrate an example of modifying blockchain 301 and/or world state information based on an interaction with a particular blockchain 301 that is associated with a particular node group 105. As shown, a particular node 107-1, of node group 105, may receive (at 1002) a proposed on-chain operation (e.g., a request to access or record information to blockchain 301) from a particular source, such as client device 103 (e.g., which may be or may be implemented by a device or system that has access to node 107-1, such as a device or system that has authentication credentials, locator information, etc. via which client device 103 is able to interact with node 107-1). In some embodiments, node 107-1 may receive the proposed on-chain operation from BMS 201 (e.g., which may receive the proposed on-chain operation from client device 103, BNBS 101, and/or some other source, and may select node 107-1 out of a group of nodes 107, such as a group of nodes associated with the same channel in a channel-based blockchain system, such as the Hyperledger® Fabric), an ordering node, or other suitable device or system.

While the example process described with respect to FIGS. 10A and 10B is presented in the context of a single node 107 performing particular operations (e.g., performing the requested on-chain operation), techniques described above may be used to split up the operations such that multiple nodes 107 may perform different portions of the operations. For example, as discussed above, BMS 201 may instruct multiple nodes 107 to perform respective portions of the on-chain operation (e.g., based on information provided by BNBS 101, such as data structure 503 and/or similar information).

Client device 103 may be, for example, an entity associated with blockchain 301 (e.g., may be associated with an address, a "wallet," a decentralized application ("dApp"), etc.). In this example, assume that client device 103 is authorized to initiate, request, etc. the proposed on-chain operation, which may include the modification of one or more values of one or more attributes that are currently associated with blockchain 301, the addition of one or more attributes to blockchain 301, or other suitable interactions. In other examples, node 107-1 and/or some other device or system may verify that client device 103 is authorized to initiate the proposed on-chain operation.

In some embodiments, the proposed on-chain operation (received at 1002) may indicate particular chaincode recorded to blockchain 301, which may specify one or more inputs (e.g., types of inputs, quantity of inputs, and/or other input parameters), and may also include actions to take with respect to the inputs in order to generate one or more outputs. For example, the proposed on-chain operation may specify particular chaincode (e.g., an address associated with blockchain 301 with which a record that includes the chaincode is associated) and one or more input values according to input parameters specified by the particular chaincode. In some examples, the proposed on-chain operation may refer to one or more values that have previously been recorded to blockchain 301 (and thus reflected in world state information associated with blockchain 301), such as an interaction that increments or decrements previously recorded values or performs other computations based on previously recorded values.

Node 107-1 may execute (at 1004) the proposed on-chain operation, which may include accessing the one or more values that were previously recorded to blockchain 301. In order to determine the one or more values referred to in the proposed on-chain operation, node 107-1 may access world state information, maintained by node 107-1, to determine such values. Such access may include checking a local cache and/or accessing, via a network, a remote system (e.g., a "cloud" system, a containerized system, etc.) associated with node 107-1 that maintains the world state associated with blockchain 301. The execution (at 1004) may be a "simulation" of the proposed on-chain operation, inasmuch as the execution and of the proposed on-chain operation and the ensuing result may not yet be recorded to blockchain 301. The interaction may become "final" or "committed" based on validation by one or more other nodes. The result may include a "read-write set," which may include the values of the one or more attributes that were accessed (e.g., the values based on which the interaction was performed), as well as the resulting values after execution of the proposed interaction.

Node 107-1 may provide (at 1006) the result set (e.g., the read-write set) based on executing (at 1004) the proposed interaction to client device 103. Client device 103 may maintain the result set to, for example, verify and/or to provide approval of the result set before the result set is committed to blockchain 301. Node 107-1 and/or BMS 201 may also provide (at 1008) the proposed on-chain operation to one or more other nodes 107 associated with blockchain 301, such as nodes 107-2 and 107-3. In some embodiments, node 107-1 may provide (at 1008) the result set generated by node 107-1 to nodes 107-2 and 107-3. Nodes 107-1 through 107-3 may all be associated with the same channel, nodes 107-2 and 107-3 may be specified by the chaincode as validators, and/or nodes 107-2 and 107-3 may otherwise be identified by node 107-1 or an associated blockchain management system as nodes that should validate, endorse, etc. the execution and result of the proposed interaction.

As similarly discussed with respect to node 107-1, nodes 107-2 and 107-3 may execute (at 1010), and/or simulate the execution of, the proposed interaction. Accordingly, nodes 107-2 and 107-3 may access one or more values that were previously recorded to blockchain 301 using world state information maintained by nodes 107-2 and 107-3. Nodes 107-2 and 107-3 may validate, verify, etc. the result set generated by node 107-1 by comparing the result set with respective result sets generated by nodes 107-2 and 107-3. Nodes 107-2 and 107-3 may respond (at 1012) to node 107-1 with respective result sets generated by nodes 107-2 and 107-3, and/or may respond with an indication, endorsement, etc. (e.g., which may be respectively signed by nodes 107-2 and 107-3) that the result set generated by node 107-1 is valid. Once node 107-1 has received endorsements from at least a threshold quantity of other nodes (e.g., from nodes 107-2 and 107-3, in this example), node 107-1 may determine that a consensus has been reached with respect to the result set for the proposed interaction.

As shown in FIG. 10B, node 107-1 may accordingly provide (at 1014), to client device 103, an indication that consensus for the result set (provided at 1006) has been reached. In some embodiments, client device 103 may validate the consensus (e.g., by evaluating signatures of nodes 107-2 and 107-3) and/or may verify the result set (e.g., by itself executing the proposed interaction). Client device 103 may provide (at 1016), to node 107-1, an indication that client device 103 has validated the consensus and/or has verified the result set. In some embodiments, the consensus validation indication may be signed by client device 103, thus securely authenticating the validation by client device 103.

Node 107-1 may provide (at 1018) the result set, along with the consensus validation indication and the proposed on-chain operation, to ordering node 1003. Ordering node 1003 may be a node, associated with the same channel as nodes 107-1 through 107-3, that validates (at 1020) the consensus validation indication (e.g., validates signatures associated with client device 103 and/or nodes 107-1 through 107-3) and generates a block, to be recorded to blockchain 301, that includes information regarding the on-chain operation. Such information may include an identifier of client device 103 (e.g., an address, wallet identifier, etc.), identifiers of nodes 107-1 through 107-3 that participated in generating and/or validating the result set based on the on-chain operation, chaincode inputs provided by client device 103, the consensus validation indication, one or more timestamps of the above operations and/or other events, and/or other suitable information associated with the on-chain operation. In some embodiments, the block may be signed by ordering node 1003, thus securely authenticating the block creation by ordering node 1003. At this point, the on-chain operation may no longer be a "proposed" on-chain operation, as the interaction has been finalized, committed, etc. by ordering node 1003. In some implementations, nodes 107-1 through 107-3 may be referred to as "peers," to indicate that such nodes 107-1 through 107-3 are distinct from ordering node 1003 (e.g., ordering node 1003 performs one or more different operations from the peers).

Ordering node 1003 may propagate (at 1022) the signed block, including information regarding the finalized on-chain operation initiated by client device 103, to nodes 107-1 through 107-3 and/or other nodes associated with the same channel. Nodes 107-1 through 107-3 may validate (at 1024) the block, which may include verifying the signature of ordering node 1003, and may accordingly update a respective copy of blockchain 301 as maintained by each one of nodes 107-1 through 107-3. Nodes 107-1 through 107-3 may maintain respective independent copies of blockchain 301, thus providing an element of decentralization to blockchain 301. As such, when adding the block (received at 1022), nodes 107-1 through 107-3 may continue to maintain separate copies of the same blockchain 301, including the information regarding the finalized on-chain operation.

Nodes 107-1 through 107-3 may also maintain respective world state information 1005 (e.g., world state information 1005-1, 1005-2, and 1005-3). For example, world state information 1005 may include a portion of the information stored in blockchain 301, such as the latest version of some or all of the attributes for which information has been recorded to blockchain 301. Nodes 107-1 through 107-3 may accordingly update (at 1026) respective copies of world state information 1005 based on the received block. For example, in the event that the block includes a change in the value of a particular attribute, nodes 107-1 through 107-3 may update world state information 1005-1 through 1005-3, respectively, to replace a previous value of the attribute (e.g., a previous version of the attribute) with the newly received value of the particular attribute.

Figure 11:
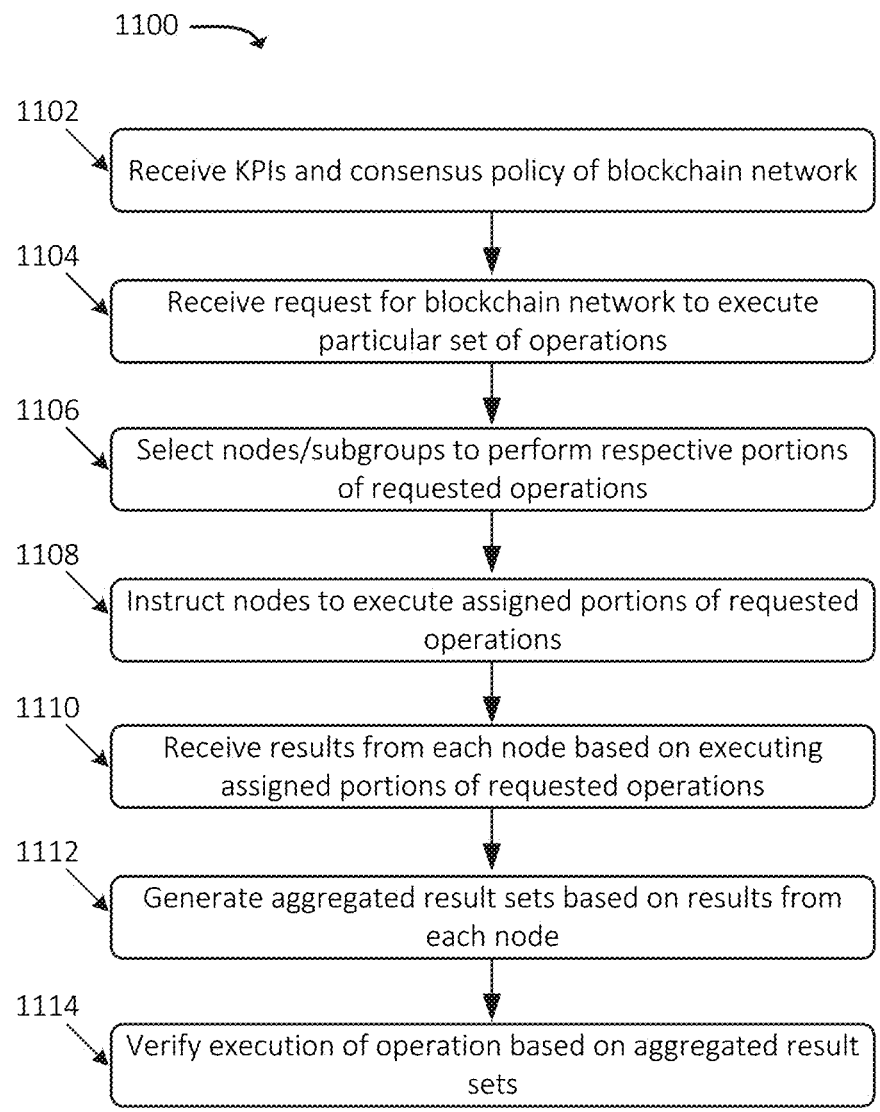
FIG. 11 illustrates an example process for a node load-balancing mechanism of some embodiments, in accordance with some embodiments.

FIG. 11 illustrates an example process 1100 for a node load-balancing mechanism of some embodiments. In some embodiments, some or all of process 1100 may be performed by BNBS 101. In some embodiments, one or more other devices may perform some or all of process 1100 in concert with BNBS 101, such as BMS 201.

As shown, process 1100 may include receiving (at 1102) KPIs and a consensus policy of a blockchain network (e.g., a particular node group 105). As discussed above, the KPIs may include processor load metrics, memory load metrics, and/or other suitable metrics associated with respective nodes 107 of node group 105. The consensus policy may indicate a particular quantity of result sets used to verify the execution of an operation by node group 105, which may serve as a decentralization and/or security mechanism to prevent unilateral or otherwise malicious modification of blockchain 301 maintained by node group 105.

Process 1100 may further include receiving (at 1104) a request for the blockchain network to execute a particular set of operations. The particular set of operations may be specified by chaincode recorded to blockchain 301 or other suitable operations. The request may include a set of input parameters, which may be passed as input when executing the particular set of operations.

Process 1100 may additionally include selecting (at 1106) particular nodes 107 (e.g., node subgroups 109) to execute respective portions of the requested operations. For example, as discussed above, BNBS 101 may identify KPIs of individual nodes 107 to identify nodes 107 that are overloaded, underutilized, etc. Generally, BNBS 101 may identify an efficient or optimal delegation of portions of the requested operations to assign to respective nodes 107, in order to optimize yields such as resource utilization and/or time of processing. As discussed above, splitting the operation into portions may include identifying discrete parts of the operations to be performed by different nodes 107, may include identifying particular subsets of the input parameters to be used by different nodes 107 when executing the operations (or parts of the operations), and/or otherwise splitting up the requested operations into different portions. The quantity of node subgroups 109 may be selected such that the consensus policy is satisfied. That is, the quantity of node subgroups 109 may be greater than or equal to the quantity of result sets as specified in the consensus policy.

Process 1100 may also include instructing (at 1108) nodes 107 of the blockchain network to execute respective assigned portions of the requested operations. For example, as discussed above, BNBS 101 may output a request to BMS 201, indicating assignments of which particular nodes 107 should perform which particular portions of the requested operations. BMS 201 may instruct such nodes 107 to execute respective assigned portions of the operations, which may include broadcasting such instructions and assignments to all nodes 107, and/or instructing individual nodes 107 to perform respective assigned portions of the operations.

Process 1100 may further include receiving (at 1110) results from each node 107 based on execution of the assigned portions of the requested operations. As discussed above, each node 107 may provide results along with a cryptographic signature, indicating authenticity of the respective results from each node 107. Additionally, the results may be provided such that BNBS 101 is able to identify which results are received from which particular node 107.

Process 1100 may additionally include generating (at 1112) aggregated result sets based on the results from each node 107. For example, each aggregated result set may be associated with a particular node subgroup 109. In this manner, since the quantity of node subgroups 109 meets or exceeds the quantity specified by the consensus policy, the quantity of result sets may also meet or exceed the quantity specified by the consensus policy.

Process 1100 may also include verifying (at 1114) execution of the operation based on the aggregated result sets. For example, BNBS 101 may compare the results, included in each aggregated result set, and may verify the execution of the operation as if each aggregated result set were associated with (e.g., computed and provided by) a single node 107. Assuming the results match, BNBS 101 may perform additional operations, such as generating a signed message indicating that BNBS 101 has approved or validated the results, requesting the blockchain network to record the results to blockchain 301, and/or other suitable operations.

Figure 12:
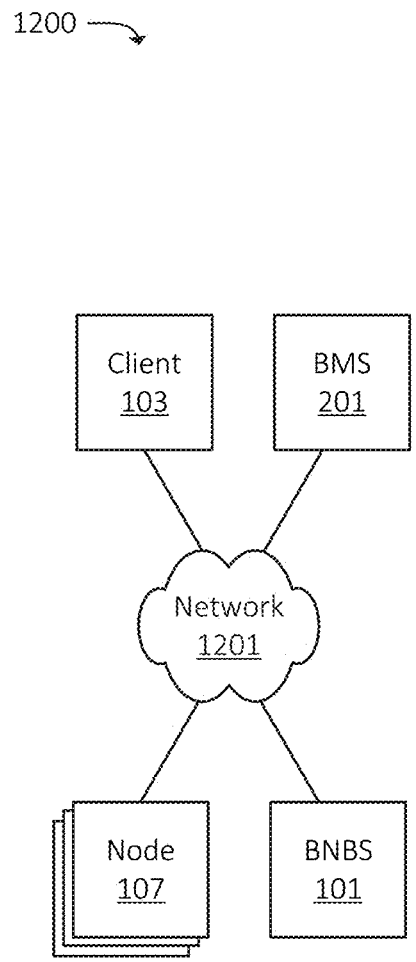
FIG. 12 illustrates an example environment in which one or more embodiments, described herein, may be implemented.

FIG. 12 illustrates an example environment 1200, in which one or more embodiments may be implemented. Environment 1200 may include network 1201, client device 103, BMS 201, and nodes 107. In some embodiments, environment 1200 may include one or more additional devices or systems communicatively coupled to network 1201 and/or one or more other networks.

The quantity of devices and/or networks, illustrated in FIG. 12, is provided for explanatory purposes only. In practice, environment 1200 may include additional devices and/or networks, fewer devices and/or networks, different devices and/or networks, or differently arranged devices and/or networks than illustrated in FIG. 12. For example, while not shown, environment 1200 may include devices that facilitate or enable communication between various components shown in environment 1200, such as routers, modems, gateways, switches, hubs, etc. In some implementations, one or more devices of environment 1200 may be physically integrated in, and/or may be physically attached to, one or more other devices of environment 1200. Alternatively, or additionally, one or more of the devices of environment 1200 may perform one or more network functions described as being performed by another one or more of the devices of environment 1200. Elements of environment 1200 may interconnect with each other and/or other devices via wired connections, wireless connections, or a combination of wired and wireless connections. Some or all of the elements of environment 1200 may be implemented by one or more devices, sets of hardware resources, cloud systems, or the like.

Network 1201 may include one or more wired and/or wireless networks. For example, network 1201 may include an IP-based Packet Data Network ("PDN"), a wide area network ("WAN") such as the Internet, a private enterprise network, and/or one or more other networks. Client device 103, BMS 201, nodes 107, and/or other devices or systems may communicate, through network 1201, with each other and/or with other devices that are coupled to network 1201. Network 1201 may be connected to one or more other networks, such as a public switched telephone network ("PSTN"), a public land mobile network ("PLMN"), and/or another network. Network 1201 may be connected to one or more devices, such as content providers, applications, web servers, and/or other devices, with which client device 103, BMS 201, nodes 107, and/or other devices or systems may communicate.

Client device 103, BMS 201, nodes 107, and/or other devices or systems may be implemented by one or more cloud systems, server devices, or other types of hardware resources. In some embodiments, BNBS 101, client device 103, BMS 201, and/or nodes 107 may be implemented by or communicatively coupled to a User Equipment ("UE"), which may include a computation and communication device, such as a wireless mobile communication device that is capable of communicating with network 1201. The UE may communicate with network 1201 via a wired or a wireless interface, such as via one or more radio access network ("RANs"), such as a Fifth Generation ("5G") RAN, a Long-Term Evolution ("LTE") RAN, etc. The UE may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), a Fixed Wireless Access ("FWA") device, or another type of mobile computation and communication device.

Figure 13:
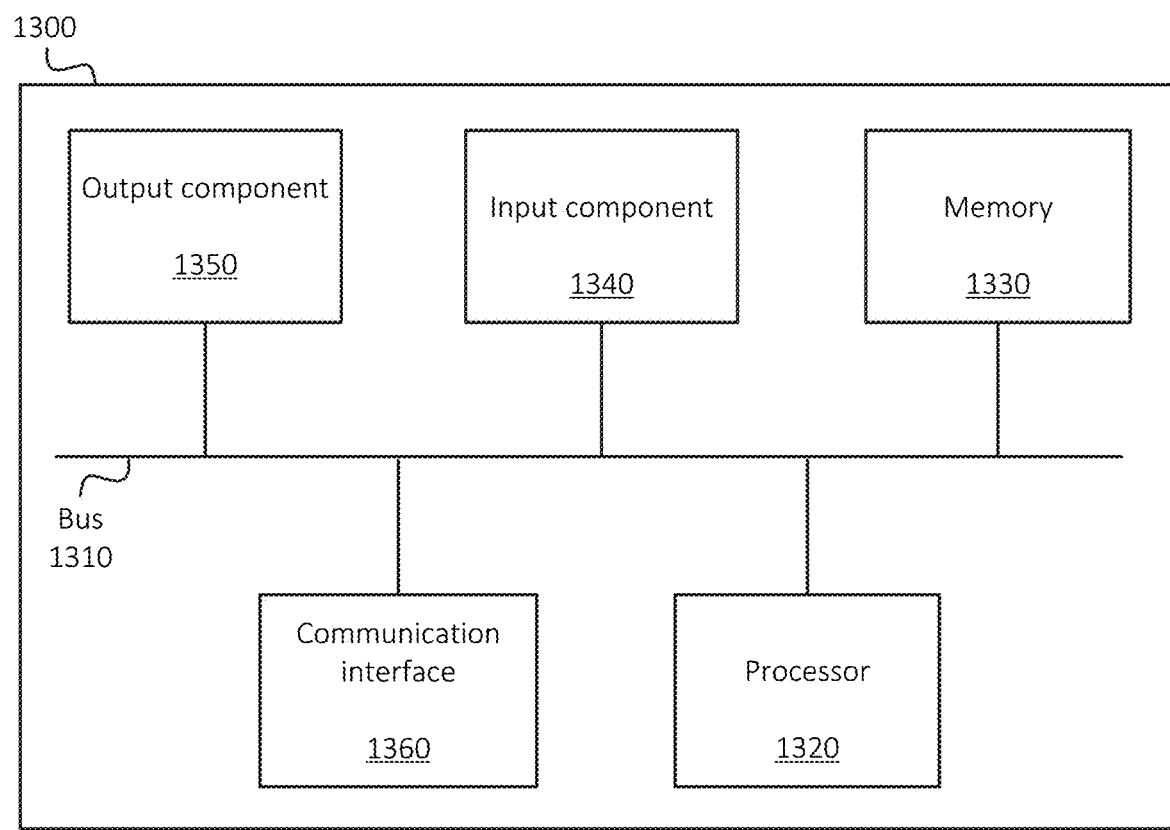
FIG. 13 illustrates example components of one or more devices, in accordance with one or more embodiments described herein.

FIG. 13 illustrates example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, a set of provisioned hardware resources of a cloud computing system, or other suitable type of hardware that interprets and/or executes instructions (e.g., processor-executable instructions). In some embodiments, processor 1320 may be or may include one or more hardware processors. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300 and/or other receives or detects input from a source external to input component 1340, such as a touchpad, a touchscreen, a keyboard, a keypad, a button, a switch, a microphone or other audio input component, etc. In some embodiments, input component 1340 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1300 may include more than one communication interface 1360. For instance, device 1300 may include an optical interface, a wireless interface, an Ethernet interface, and/or one or more other interfaces.

Device 1300 may perform certain operations relating to one or more processes described above. Device 1300 may perform these operations in response to processor 1320 executing instructions, such as software instructions, processor-executable instructions, etc. stored in a computer-readable medium, such as memory 1330. A computer-readable medium may be defined as a non-transitory memory device. A memory device may include space within a single physical memory device or spread across multiple physical memory devices. The instructions may be read into memory 1330 from another computer-readable medium or from another device. The instructions stored in memory 1330 may be processor-executable instructions that cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-11), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more hardware processors configured to:
receive Key Performance Indicators ("KPIs") associated with a plurality of nodes of a blockchain network;
receive a request for the blockchain network to execute a particular set of operations;
identify a consensus policy of the blockchain network, wherein the consensus policy indicates a particular quantity of result sets used to verify operations performed by nodes of the blockchain network;
select a particular quantity of subgroups of the blockchain network based on the received KPIs, wherein each subgroup includes one or more nodes of the blockchain network, wherein the particular quantity of subgroups is greater than or equal to the particular quantity of result sets indicated in the consensus policy;
for each subgroup, assign respective portions of the particular set of operations to be performed by respective nodes of the subgroup, wherein splitting the particular set of operations is based on the received KPIs;
instruct each node of each subgroup to execute the respective portion of operations assigned to each node;
receive results, from each node of each subgroup, of performing respective portions of the operations as assigned to each node;
generate an aggregated result set associated with each subgroup based on the received results; and
verify consensus of execution of the requested particular set of operations based on the aggregated result set associated with each subgroup.

2. The device of claim 1, wherein the KPIs associated with a particular node of the plurality of nodes include processor load metrics or memory load metrics.

3. The device of claim 1, wherein the request to execute the particular set of operations includes a particular set of input parameters, wherein assigning a respective portion of the particular set of operations to a particular node includes assigning a particular subset of the input parameters to the particular node.

4. The device of claim 1, wherein the particular set of operations are specified in chaincode recorded to a blockchain maintained by the blockchain network.

5. The device of claim 1, wherein the one or more hardware processors are further configured to:
initiate a recordation of data, included in the aggregated result sets, to a blockchain maintained by the blockchain network based on verifying consensus of execution of the requested particular set of operations.

6. The device of claim 1, wherein the portions of the particular set of operations, assigned to nodes of a first subgroup, are different from portions of the particular set of operations assigned to nodes of a second subgroup.

7. The device of claim 6, wherein a first aggregated result set, associated with the first subgroup, includes a same result set as a second aggregated result set, associated with the second subgroup.

8. A non-transitory computer-readable medium, storing a plurality of processor-executable instructions to:
receive Key Performance Indicators ("KPIs") associated with a plurality of nodes of a blockchain network;
receive a request for the blockchain network to execute a particular set of operations;
identify a consensus policy of the blockchain network, wherein the consensus policy indicates a particular quantity of result sets used to verify operations performed by nodes of the blockchain network;
select a particular quantity of subgroups of the blockchain network based on the received KPIs, wherein each subgroup includes one or more nodes of the blockchain network, wherein the particular quantity of subgroups is greater than or equal to the particular quantity of result sets indicated in the consensus policy;
for each subgroup, assign respective portions of the particular set of operations to be performed by respective nodes of the subgroup, wherein splitting the particular set of operations is based on the received KPIs;
instruct each node of each subgroup to execute the respective portion of operations assigned to each node;
receive results, from each node of each subgroup, of performing respective portions of the operations as assigned to each node;
generate an aggregated result set associated with each subgroup based on the received results; and
verify consensus of execution of the requested particular set of operations based on the aggregated result set associated with each subgroup.

9. The non-transitory computer-readable medium of claim 8, wherein the KPIs associated with a particular node of the plurality of nodes include processor load metrics or memory load metrics.

10. The non-transitory computer-readable medium of claim 8, wherein the request to execute the particular set of operations includes a particular set of input parameters, wherein assigning a respective portion of the particular set of operations to a particular node includes assigning a particular subset of the input parameters to the particular node.

11. The non-transitory computer-readable medium of claim 8, wherein the particular set of operations are specified in chaincode recorded to a blockchain maintained by the blockchain network.

12. The non-transitory computer-readable medium of claim 8, wherein the plurality of processor-executable instructions further include processor-executable instructions to:
initiate a recordation of data, included in the aggregated result sets, to a blockchain maintained by the blockchain network based on verifying consensus of execution of the requested particular set of operations.

13. The non-transitory computer-readable medium of claim 8, wherein the portions of the particular set of operations, assigned to nodes of a first subgroup, are different from portions of the particular set of operations assigned to nodes of a second subgroup.

14. The non-transitory computer-readable medium of claim 13, wherein a first aggregated result set, associated with the first subgroup, includes a same result set as a second aggregated result set, associated with the second subgroup.

15. A method, comprising:
receiving Key Performance Indicators ("KPIs") associated with a plurality of nodes of a blockchain network;
receiving a request for the blockchain network to execute a particular set of operations;
identifying a consensus policy of the blockchain network, wherein the consensus policy indicates a particular quantity of result sets used to verify operations performed by nodes of the blockchain network;
selecting a particular quantity of subgroups of the blockchain network based on the received KPIs, wherein each subgroup includes one or more nodes of the blockchain network, wherein the particular quantity of subgroups is greater than or equal to the particular quantity of result sets indicated in the consensus policy;

for each subgroup, assigning respective portions of the particular set of operations to be performed by respective nodes of the subgroup, wherein splitting the particular set of operations is based on the received KPIs;

instructing each node of each subgroup to execute the respective portion of operations assigned to each node;

receiving results, from each node of each subgroup, of performing respective portions of the operations as assigned to each node;

generating an aggregated result set associated with each subgroup based on the received results; and verifying consensus of execution of the requested particular set of operations based on the aggregated result set associated with each subgroup.

16. The method of claim 15, wherein the KPIs associated with a particular node of the plurality of nodes include processor load metrics or memory load metrics.

17. The method of claim 15, wherein the request to execute the particular set of operations includes a particular set of input parameters, wherein assigning a respective portion of the particular set of operations to a particular node includes assigning a particular subset of the input parameters to the particular node.

18. The method of claim 15, wherein the particular set of operations are specified in chaincode recorded to a blockchain maintained by the blockchain network.

19. The method of claim 15, further comprising:
initiating a recordation of data, included in the aggregated result sets, to a blockchain maintained by the blockchain network based on verifying consensus of execution of the requested particular set of operations.

20. The method of claim 15, wherein the portions of the particular set of operations, assigned to nodes of a first subgroup, are different from portions of the particular set of operations assigned to nodes of a second subgroup, and wherein a first aggregated result set, associated with the first subgroup, includes a same result set as a second aggregated result set, associated with the second subgroup.

* * * * *